United States Patent

[11] 3,611,988

[72] Inventor  Wolfgang Hess
               Oberer Bassenheimer, Germany
[21] Appl. No. 832,766
[22] Filed     June 12, 1969
[45] Patented  Oct. 12, 1971
[73] Assignee  Girling Limited
[32] Priority  June 26, 1968
[33]           Great Britain
[31]           30,555/68

[54] PARALLEL ABUTMENTS AND CIRCUMFERENTIALLY EXTENDED PADS
     2 Claims, 4 Drawing Figs.
[52] U.S. Cl. .................................. 188/72.5,
                    188/73.1, 188/73.3, 188/250 B
[51] Int. Cl. ................................. F16d 55/228
[50] Field of Search ....................... 188/71.1,
                                    73.1, .3, 250 B, 72.5

[56]                References Cited
                 UNITED STATES PATENTS
3,261,429  7/1966  Burnett et al. ............. 188/73.3 X
3,375,906  4/1968  Hayes ....................... 188/73.3
3,442,356  5/1969  Hahm ........................ 188/72.4

Primary Examiner—George E. A. Halvosa
Attorney—Scrivener, Parker, Scrivener and Clark ABSTRACT: In a vehicle disc brake comprising a caliper structure adapted to straddle the brake disc, each of the two parts of the caliper, which lie on opposite sides of the disc being formed with surfaces extending perpendicular to the plane of the disc for guiding one of a pair of opposed brake pads, the pad-guiding surface at each of the circumferentially spaced ends of each pad is divided into two separate coplanar portions with a gap between them and the pad is so shaped and dimensioned that at each end it projects circumferentially outwards beyond the plane of the respective guiding surface, through the gap between the two portions thereof.

PATENTED OCT 12 1971 3,611,988

PARALLEL ABUTMENTS AND CIRCUMFERENTIALLY EXTENDED PADS

This invention relates to vehicle disc brakes of the kind comprising a caliper structure formed in two parts secured together, the jointing surfaces of the two parts lying in a plane parallel to that of the disc, the two parts together providing a pair of caliper halves disposed respectively on opposite sides of the disc and a bridge portion which straddles the disc and joins the two halves together, each caliper half being formed with surfaces extending perpendicular to the plane of the disc for guiding one of a pair of opposed brake pads.

In accordance with the invention the pad-guiding surface at each end of each pad comprises two separate coplanar portions, spaced apart radially of the disc, and the pad projects circumferentially outwards beyond the plane of the guiding surface between the two separate portions thereof. This arrangement allows the area (and hence the volume) of pad material to be increased for a given spacing of the guiding surfaces.

The invention is particularly but not exclusively applicable to vehicle disc brakes constructed in accordance with the teaching of the copending application for Pat. Ser. No. 808,066 filed Mar. 18, 1969 and is further described below in its application to such a brake.

One particular form of brake in accordance with the invention will now be described in detail, by way of example, with reference to the accompanying drawings, in which.

Figure 1:
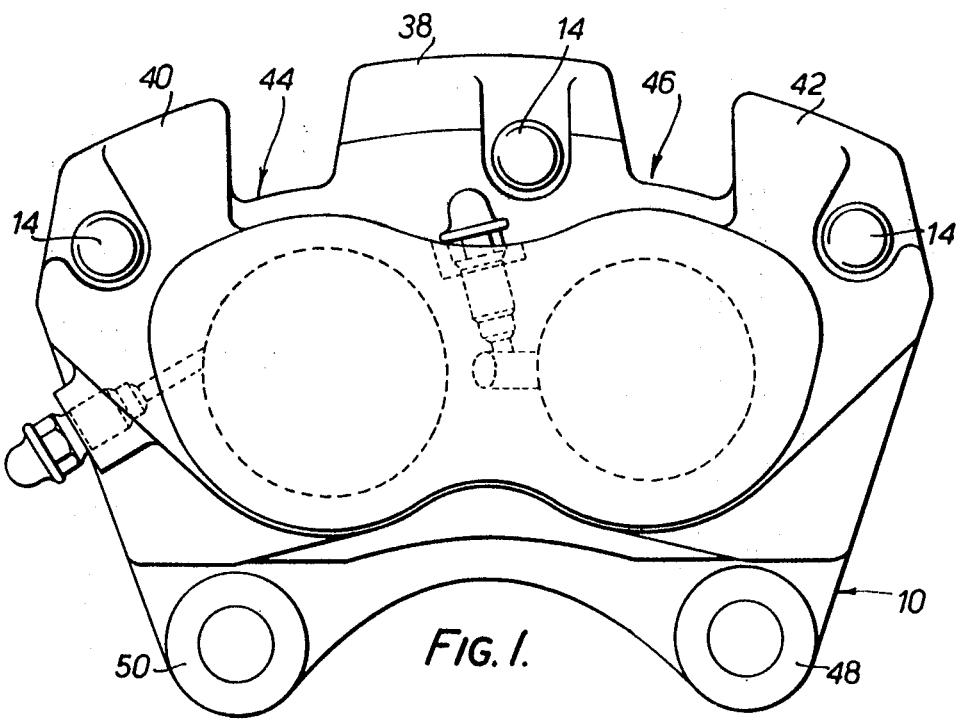
FIG. 1 is a view in elevation of the brake with the disc removed.
Figure 2:
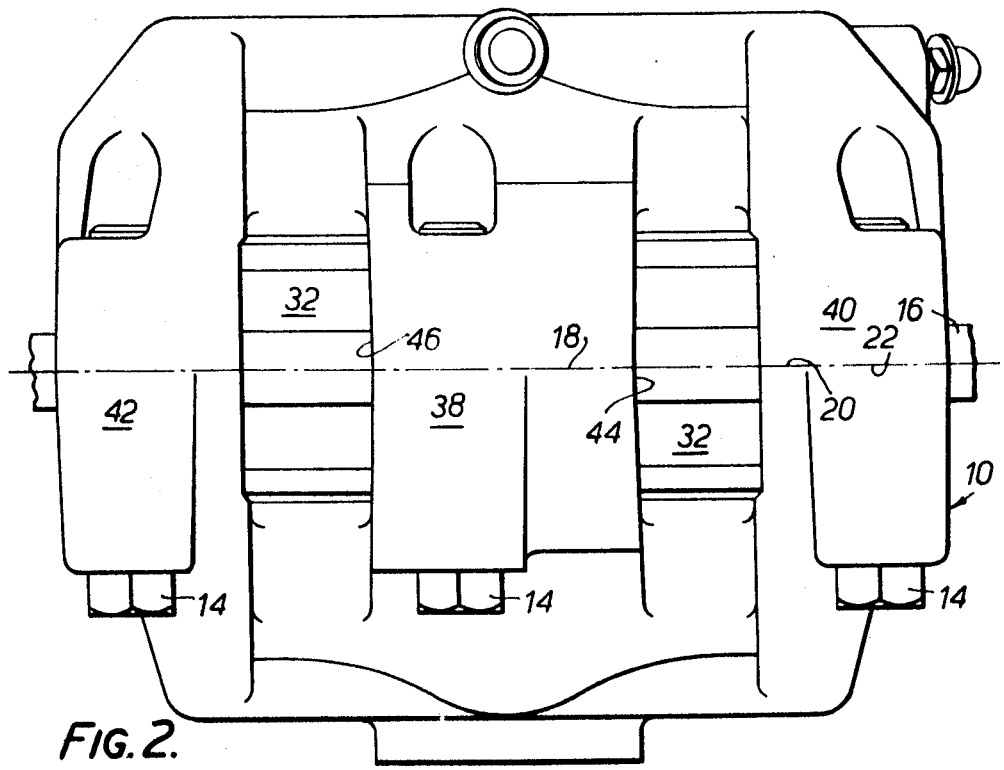
FIG. 2 is a plan view.
Figure 3:
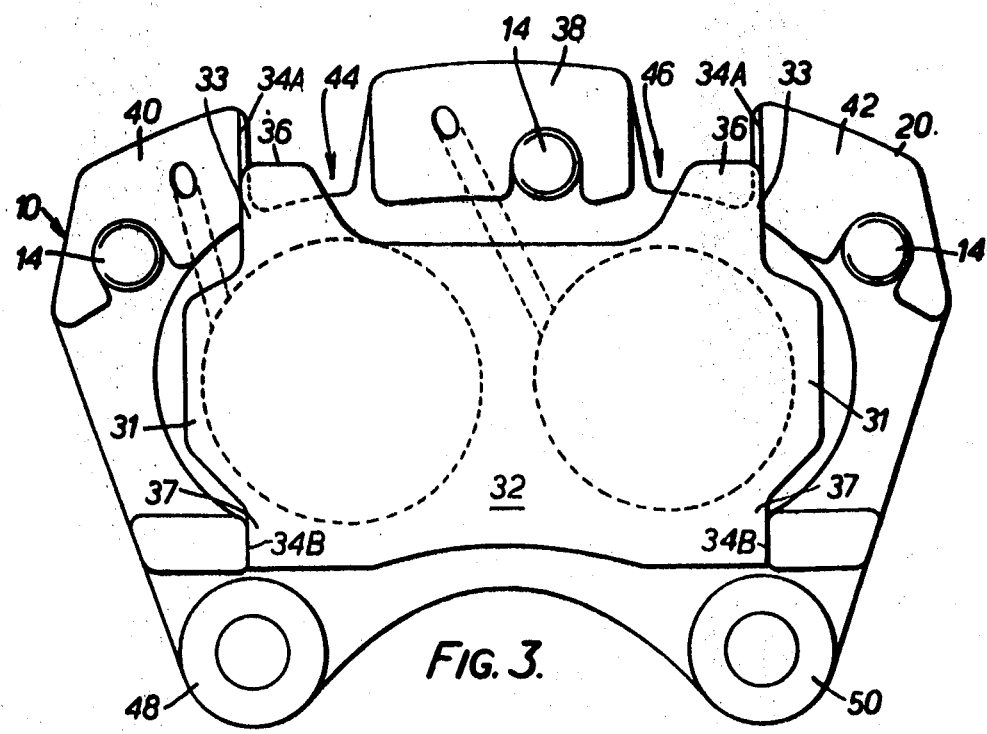
FIG. 3 is a view in elevation as in FIG. 1 with part of the caliper removed.
Figure 4:
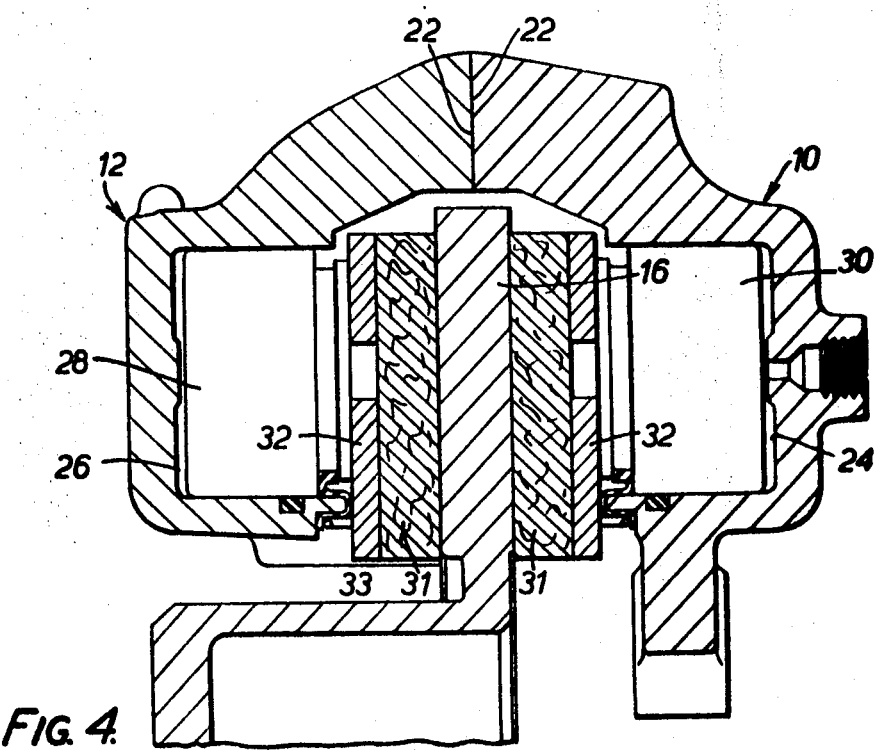
FIG. 4 is a sectional side view along the line AA in FIG. 3.

The brake caliper or housing is made up of two castings 10 and 12 bolted together by connecting bolts 14 which pass through the bridge section of the caliper straddling the outer edge of the disc 16; the caliper having a split line 18 coinciding with the center plane of the disc and defined by matching faces 20 and 22 on the respective parts 10 and 20.

The two halves of the caliper which lie on opposite sides of the disc and are connected together by the bridge section are each formed with a pair of spaced hydraulic cylinders 24 and 26 containing sealed and booted working pistons 28 and 30 for moving a friction pad assembly 32 into engagement with the disc. The pad assembly which is spigotted to the pistons for radial retention, is positioned between a pair of parallel plane abutment surfaces 34 which serve to guide the pad for axial movement, perpendicular to the plane of the disc, and also as abutments preventing circumferential movement of the pad and absorbing the drag force during braking.

The guiding and abutment surface 34 at each of the circumferentially spaced ends of the pad comprises two separate coplanar portions 34A and 34B spaced apart radially of the disc with a gap between them, the pad 32 projecting circumferentially outwards through this gap beyond the plane of the surfaces 34. The pad 32 comprises a block of friction material 31 having one face secured to a metal backing plate 33, the opposite face of the block 31 being exposed for engagement with the face of the brake disc 16. The end faces of the portions 36 and 37 of the backing plate engage respectively the surfaces 34A and 34B and intermediate these terminal portions the end face of the pad projects beyond the common plane in which they lie.

The caliper bridge section consists of a central portion 38 and flank portions 40 and 42 which between them define a pair of windows 44 and 46 for pad inspection purposes, and their size and spacing is such that the pad-guiding surfaces 34 are also exposed to view.

One-half 10 of the caliper is provided at its radially inner end with a pair of mounting lugs 48 and 50 which are positioned in line with the respective windows 44, 46. In each caliper half, the alignment of the guiding surfaces 34 with the respective windows 44, 46 enables these surfaces and the jointing surface 20 or 22 to be machined in a single pass with a rectilinear stroke of a cutting tool, e.g. by broaching or milling. Furthermore, in the case of caliper half 10, the inner surfaces 52 of the lugs 48 and 50 can be machined in the same pass.

The hydraulic cylinders are arranged in two opposed pairs (the actuation of either pair being sufficient to move the pads into engagement with the brake disc) and the two pairs are connected into two separate and independently operated groups of opposed pot actuators. The cylinders of each pair, lying on opposite sides of the caliper, are interconnected by internal drilling passing across the bridge section.

I claim:

1. A disc brake for a vehicle comprising a disc adapted to be connected to the wheel of a vehicle for rotation therewith, a caliper comprising two halves disposed respectively on opposite sides of the disc and having a mutual joint plane parallel to the plane of the disc, means carried by one of the halves for rigidly connecting the caliper to a vehicle, said halves including abutting parts straddling the disc and defining a caliper bridging portion, bolts passing through said bridging portion and securing said caliper halves together, a pair of inwardly facing, circumferentially spaced, guiding and torque sustaining surfaces in each caliper half perpendicular to the plane of the disc, each surface being in two separate coplanar portions adjacent the outer and inner sides of each respective caliper half, said portions being spaced apart from each other radially of the disc and defining between them an open space, a paid in each caliper half having circumferentially spaced ends, each end having substantially radially spaced inner and outer parts, complementary with and slidably engaging the corresponding spaced-apart coplanar guiding surfaces in said caliper halves, each end of each of said pads being constructed and arranged to project circumferentially outwardly beyond the plane of each respective guiding surface and into the open space between the two separate portions thereof and means in each caliper half for urging the brake pad therein towards the adjacent surface of said disc.

2. A vehicle disc brake as defined in claim 1 wherein said bridging portion includes two pad inspection windows spaced apart circumferentially of the disc, and each having circumferentially spaced inner and outer sides, said bolts pass through said bridging portion between the windows and on each side of them, both portions of each of said pad guiding surfaces being aligned with a respective circumferential outer side of one of said windows.